(12) United States Patent
Vittal et al.

(10) Patent No.: US 9,563,459 B2
(45) Date of Patent: *Feb. 7, 2017

(54) CREATING MULTIPLE DIAGNOSTIC VIRTUAL MACHINES TO MONITOR ALLOCATED RESOURCES OF A CLUSTER OF HYPERVISORS

(71) Applicant: Citrix Systems, Inc., Fort Lauderdale, FL (US)

(72) Inventors: Chiradeep Vittal, Cupertino, CA (US); Alex Huang, Cupertino, CA (US); Kevin Kluge, Los Altos, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 7 days.

This patent is subject to a terminal disclaimer.

(21) Appl. No.: 14/660,815

(22) Filed: Mar. 17, 2015

(65) Prior Publication Data

US 2015/0193256 A1    Jul. 9, 2015

Related U.S. Application Data

(63) Continuation of application No. 13/686,445, filed on Nov. 27, 2012, now Pat. No. 9,015,714.

(51) Int. Cl.
*G06F 9/455* (2006.01)
*G06F 9/50* (2006.01)
*G06F 11/34* (2006.01)

(52) U.S. Cl.
CPC ....... *G06F 9/45558* (2013.01); *G06F 9/45533* (2013.01); *G06F 9/5072* (2013.01); *G06F 11/34* (2013.01); *G06F 2009/45591* (2013.01); *G06F 2009/45595* (2013.01)

(58) Field of Classification Search
CPC .... G06F 9/45558; G06F 9/5072; G06F 11/34; G06F 9/45533; G06F 2009/45595; G06F 2009/45591

See application file for complete search history.

(56) References Cited

U.S. PATENT DOCUMENTS 8,095,929 B1    1/2012  Ji et al.
8,209,695 B1    6/2012  Pruyne et al.
8,352,608 B1    1/2013  Keagy et al.
(Continued)

FOREIGN PATENT DOCUMENTS

EP    2383652 A1    11/2011
EP    2500824 A2    9/2012

OTHER PUBLICATIONS

International Search Report for PCT/US2013/069850, dated Feb. 6, 2014.
Nov. 15, 2016—EP Examination Report—EP App No. 13798832.5.

*Primary Examiner* — Benjamin Wu
(74) *Attorney, Agent, or Firm* — Banner & Witcoff, Ltd.

(57) ABSTRACT

A diagnostic virtual machine having access to resources of an infrastructure as a service cloud may be created. A user device may be provided access to the diagnostic virtual machine. In some embodiments, the diagnostic virtual machine may be configured to monitor a cluster of hypervisors, and the resources of the infrastructure as a service cloud which the diagnostic virtual machine has access to may include physical resources of the infrastructure as a service cloud that are associated with the cluster of hypervisors.

20 Claims, 6 Drawing Sheets

(56) References Cited

U.S. PATENT DOCUMENTS

| | | | |
|---|---|---|---|
| 8,417,938 B1* | 4/2013 | Considine | G06F 9/5088 713/151 |
| 8,539,484 B1 | 9/2013 | Offer et al. | |
| 8,606,878 B2 | 12/2013 | Ferris | |
| 8,650,299 B1 | 2/2014 | Huang et al. | |
| 8,707,194 B1* | 4/2014 | Jenkins | H04L 67/025 715/772 |
| 8,738,972 B1 | 5/2014 | Bakman et al. | |
| 8,850,434 B1 | 9/2014 | Butikofer et al. | |
| 2006/0294439 A1* | 12/2006 | Rolia | G06F 11/3086 714/47.1 |
| 2009/0183173 A1 | 7/2009 | Becker et al. | |
| 2010/0162259 A1 | 6/2010 | Koh et al. | |
| 2010/0235836 A1 | 9/2010 | Bratanov | |
| 2010/0269109 A1 | 10/2010 | Cartales | |
| 2010/0274890 A1 | 10/2010 | Patel et al. | |
| 2011/0022812 A1* | 1/2011 | van der Linden | G06F 9/5077 711/163 |
| 2011/0126198 A1 | 5/2011 | Vilke et al. | |
| 2011/0131335 A1* | 6/2011 | Spaltro | G06F 9/5072 709/228 |
| 2011/0185063 A1 | 7/2011 | Head et al. | |
| 2011/0219372 A1* | 9/2011 | Agrawal | G06F 9/45558 718/1 |
| 2012/0131195 A1 | 5/2012 | Morgan | |
| 2012/0144229 A1 | 6/2012 | Nadolski | |
| 2013/0024857 A1 | 1/2013 | Yusupov | |
| 2013/0042123 A1* | 2/2013 | Smith | G06F 9/5094 713/300 |
| 2013/0179736 A1 | 7/2013 | Gschwind et al. | |
| 2013/0191543 A1* | 7/2013 | Abbondanzio | H04L 47/70 709/226 |
| 2013/0198319 A1 | 8/2013 | Shen et al. | |
| 2013/0198719 A1 | 8/2013 | Raman | |
| 2013/0232486 A1 | 9/2013 | Chen et al. | |
| 2013/0238785 A1* | 9/2013 | Hawk | G06F 9/5072 709/224 |
| 2013/0254384 A1* | 9/2013 | Wray | H04L 43/08 709/224 |
| 2013/0326507 A1* | 12/2013 | McGrath | G06F 9/4856 718/1 |
| 2014/0047440 A1 | 2/2014 | Da Silva et al. | |
| 2014/0059395 A1 | 2/2014 | Mahindru et al. | |
| 2014/0068600 A1* | 3/2014 | Ashok | G06F 9/45558 718/1 |
| 2014/0075013 A1 | 3/2014 | Agrawal et al. | |
| 2014/0258519 A1* | 9/2014 | Liu | G06F 11/3409 709/224 |

* cited by examiner

CREATING MULTIPLE DIAGNOSTIC VIRTUAL MACHINES TO MONITOR ALLOCATED RESOURCES OF A CLUSTER OF HYPERVISORS

CROSS-REFERENCE TO RELATED APPLICATION

This application is a continuation of and claims priority to U.S. patent application Ser. No. 13/686,445, filed Nov. 27, 2012, and entitled "DIAGNOSTIC VIRTUAL MACHINE," the disclosure of which is incorporated by reference herein in its entirety and made part hereof.

FIELD

This application generally relates to virtualization of computers and computer networks. In particular, this application relates to a diagnostic virtual machine.

BACKGROUND

Traditionally, personal computers included operating systems, applications, and user settings for a single user. Personal computers were generally both used and managed by their owners. However, many organizations are now using virtualization, remote access, and/or clouds of computing resources to fulfill their computing needs. Clouds of virtualized computing resources generally allow for the operating systems, applications, and user settings of multiple users to be included on a single physical machine. Desktop virtualization technology allows multiple instances of an operating system to be kept separate, so the activities of one user do not affect the experience of other users. Cloud computing environments allow for computers owned by the cloud operator to be managed by the cloud operator but used by cloud users, who may be customers of the cloud operator. Cloud computing environments may also support multiple organizations via single software instances (e.g., multi-tenancy).

Virtualization and multi-tenancy present new challenges for diagnosing problems or performance issues, and providing support to end users. For example, in a traditional computing environment, when performance issues arise, an administrator can run diagnostic routines on the particular personal computer presenting the issue. In a virtualized environment, however, an administrator may not have direct access to a virtual machine presenting performance issues. For example, the owner of a virtual machine may be in a separate administrative domain, inaccessible to the cloud operator. Similarly, in a traditional computing environment, an administrator may be able to provide support to a user experiencing difficulty (e.g., via a remote desktop application). In a multi-tenant virtualized environment, however, an administrator may be unable to access the particular virtual machine utilized by the troubled user.

SUMMARY

In light of the foregoing background, the following presents a simplified summary of the present disclosure in order to provide a basic understanding of some aspects described herein. This summary is not an extensive overview, and it is not intended to identify key or critical elements or to delineate the scope of the claims. The following summary merely presents various described aspects in a simplified form as a prelude to the more detailed description provided below.

According to aspects described herein, a diagnostic virtual machine having access to resources of an infrastructure as a service cloud may be created. A user device may be provided access to the diagnostic virtual machine.

In some embodiments, the diagnostic virtual machine may be configured to monitor a cluster of hypervisors, and the resources of the infrastructure as a service cloud which the diagnostic virtual machine has access to may include physical resources of the infrastructure as a service cloud that are associated with the cluster of hypervisors.

In some embodiments, the user device that is provided access to the diagnostic virtual machine may receive input from an administrator of the cluster of hypervisors. A portion of the physical resources of the infrastructure as a service cloud associated with the cluster of hypervisors may support a virtual machine hosted by the cluster of hypervisors. The virtual machine may receive input from a user requesting assistance from the administrator of the cluster of hypervisors. The diagnostic virtual machine may be created in response to the user requesting assistance from the administrator of the cluster of hypervisors. The diagnostic virtual machine may be configured to provide access to the portion of physical resources supporting the virtual machine receiving input from the user requesting assistance from the administrator of the cluster of hypervisors.

In some embodiments, the virtual machine hosted by the cluster of hypervisors may be hosted by one or more specific hypervisors of the cluster of hypervisors, and the diagnostic virtual machine may be configured to be hosted by the one or more specific hypervisors hosting the virtual machine.

In some embodiments, the virtual machine hosted by the cluster of hypervisors may be configured to operate within a network isolated from one or more other virtual machines supported by the infrastructure as a service cloud, and the diagnostic virtual machine may be configured to operate within the network isolated from the one or more other virtual machines supported by the infrastructure as a service cloud. The network isolated from the one or more other virtual machines supported by the infrastructure as a service cloud may comprise a virtual local area network (VLAN).

In some embodiments, the diagnostic virtual machine may report one or more performance metrics related to at least some of the physical resources of the infrastructure as a service cloud associated with the cluster of hypervisors to a resource management service of the infrastructure as a service cloud. The resource management service may determine, based on the one or more performance metrics, that additional physical resources of the infrastructure as a service cloud should be allocated to the cluster of hypervisors. The resource management service may trigger allocation of the additional physical resources of the infrastructure as a service cloud to the cluster of hypervisors. The resource management service may also trigger creation of a new diagnostic virtual machine having access to the additional physical resources of the infrastructure as a service cloud.

In some embodiments, the diagnostic virtual machine may be configured to provide the user device with at least one performance metric of the resources of the infrastructure as a service cloud. The at least one performance metric may include processor utilization, memory utilization, network utilization, or storage utilization.

BRIEF DESCRIPTION OF THE DRAWINGS

Figure 1:
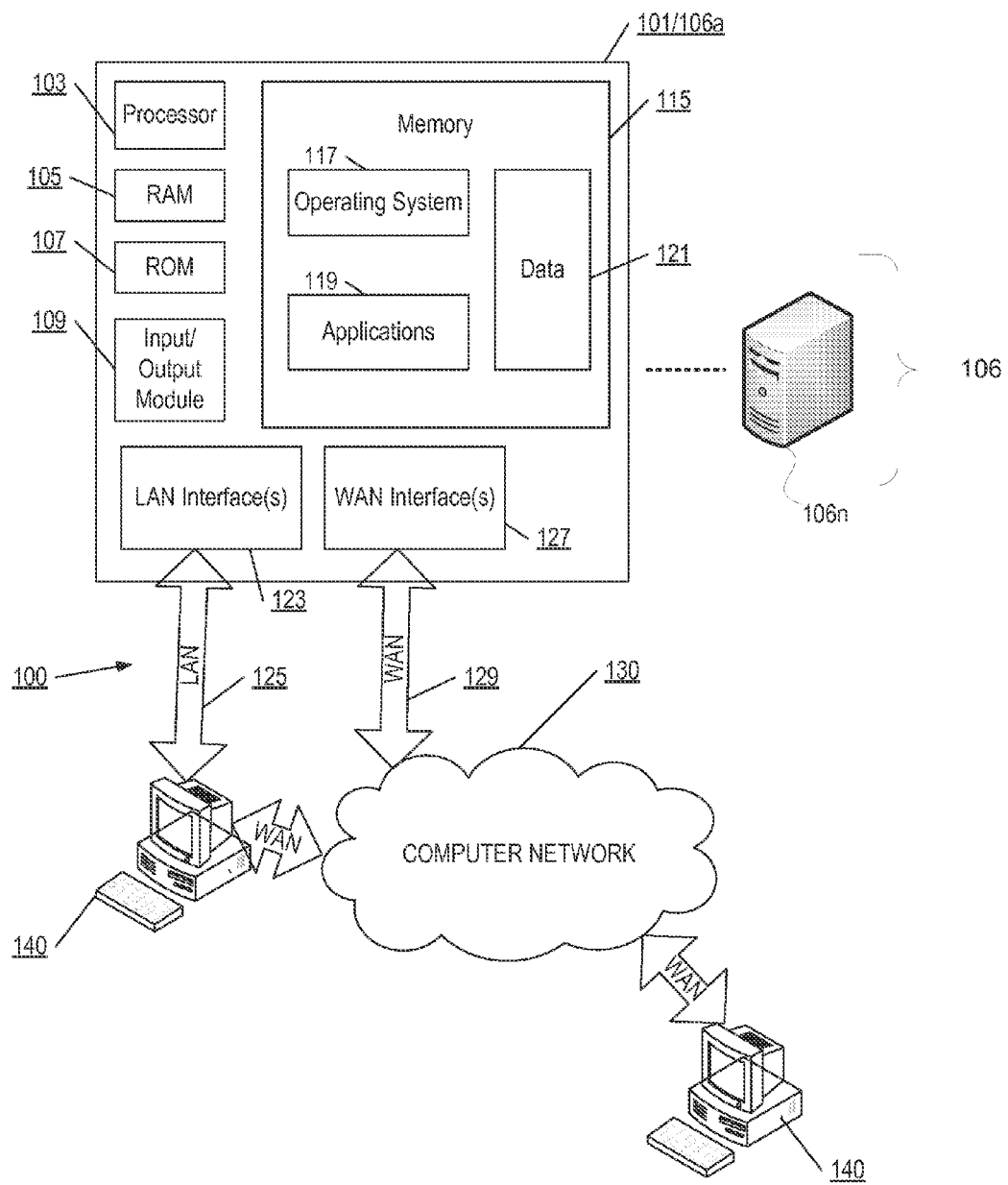

Having thus described aspects of the disclosure in general terms, reference will now be made to the accompanying drawings, which are not necessarily drawn to scale, and wherein:

FIG. 1 illustrates an example operating environment in which various aspects of the disclosure may be implemented.

Figure 2:
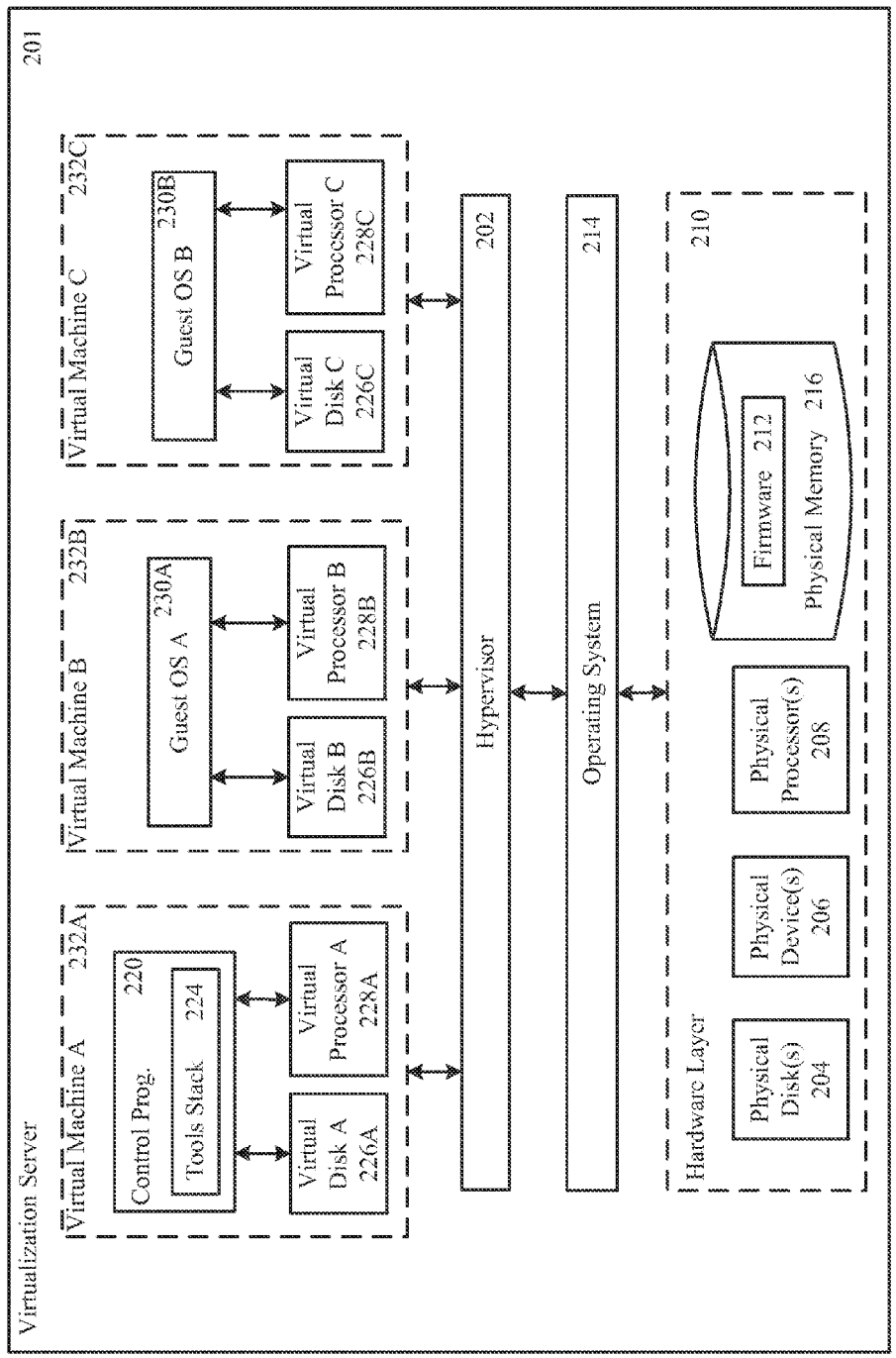

FIG. 2 is a block diagram that depicts embodiments of a virtualization server in accordance with one or more illustrative aspects described herein.

Figure 3:
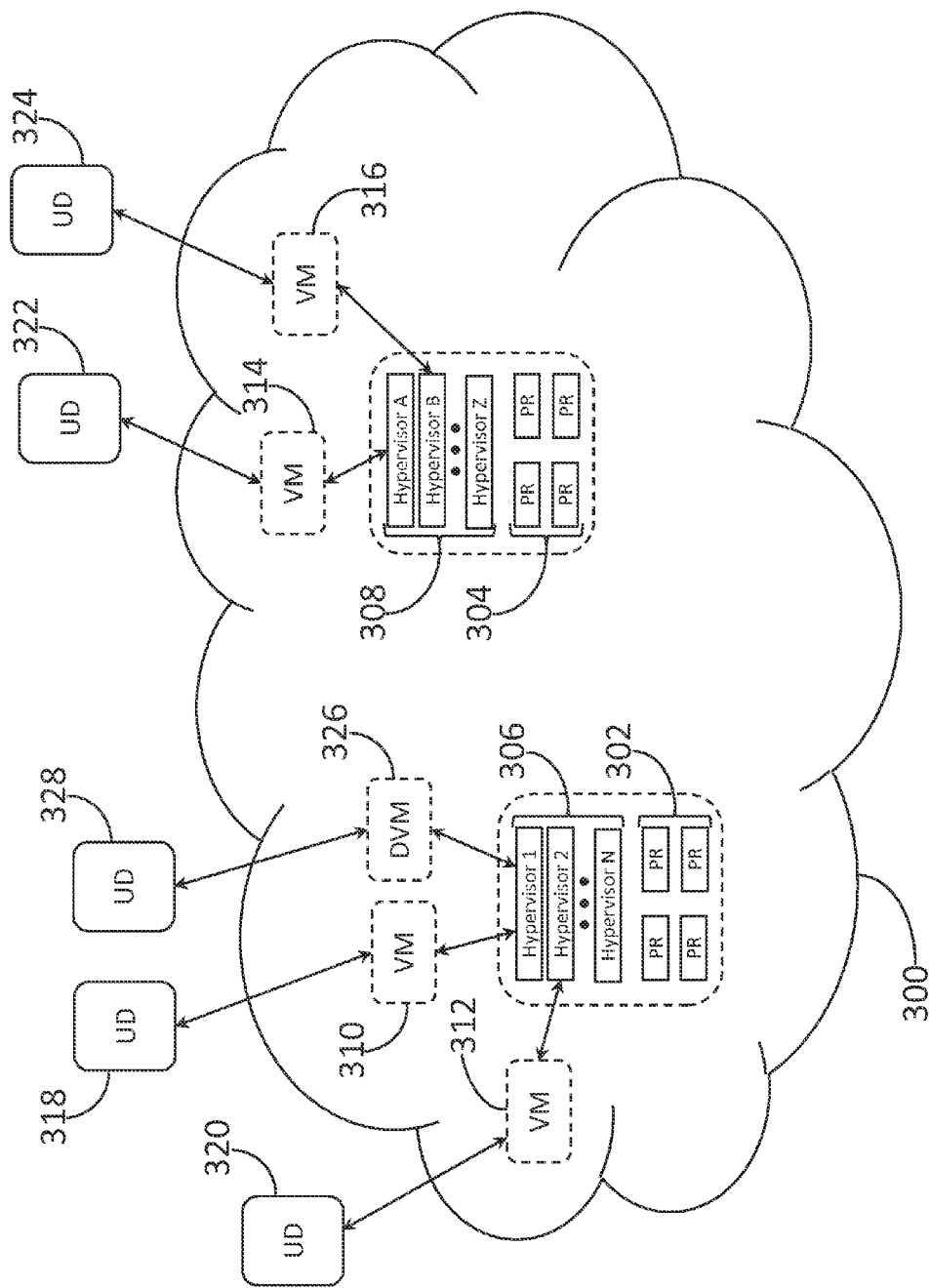

FIG. 3 shows an illustrative infrastructure as a service cloud in which a diagnostic virtual machine may be created in accordance with one or more illustrative aspects described herein.

Figure 4:
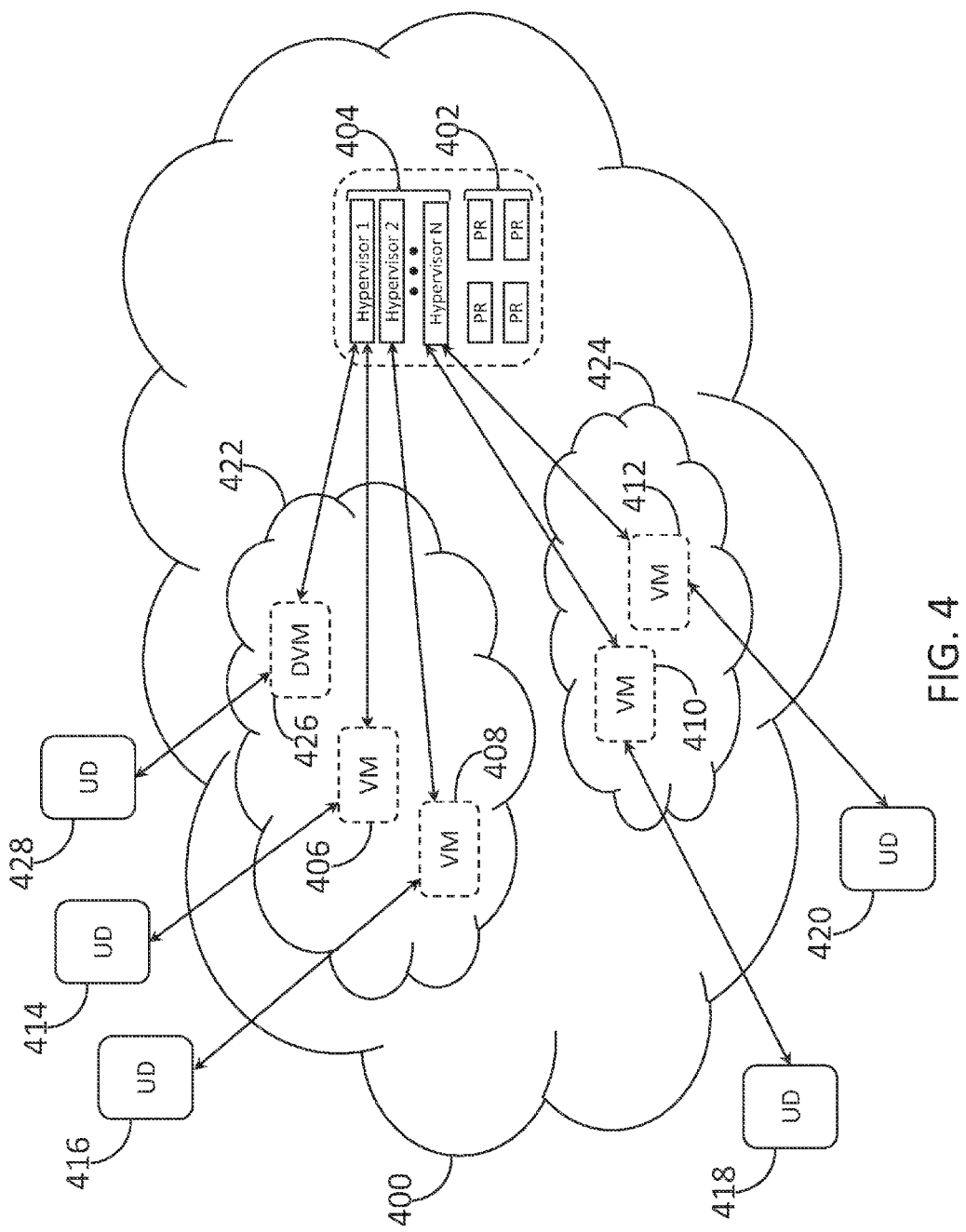

FIG. 4 shows an illustrative infrastructure as a service cloud that includes multiple isolated networks in which a diagnostic virtual machine may be created in accordance with one or more illustrative aspects described herein.

Figure 5:
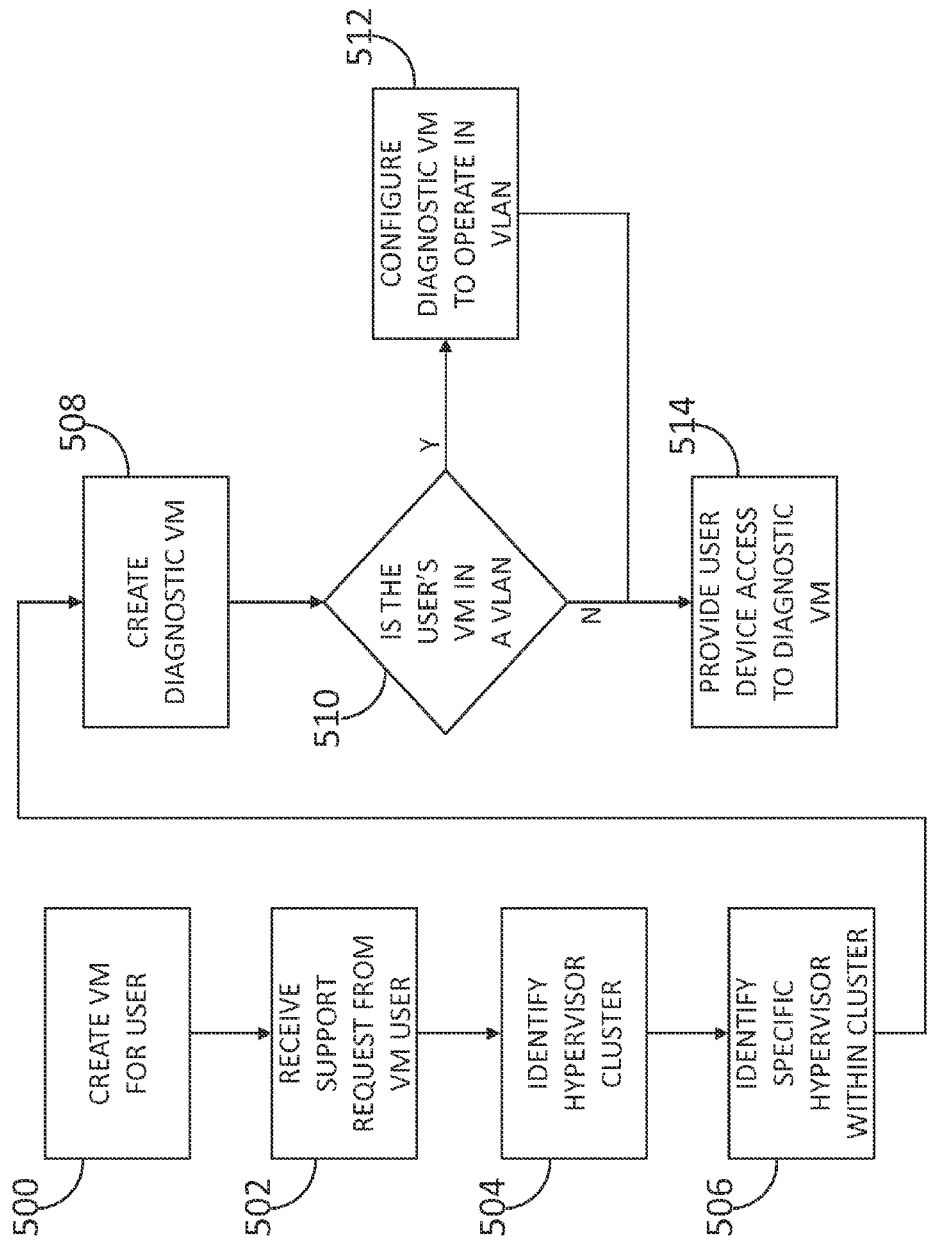

FIG. 5 illustrates a method for creating a diagnostic virtual machine in response to a user request for assistance in accordance with one or more illustrative aspects described herein.

Figure 6:
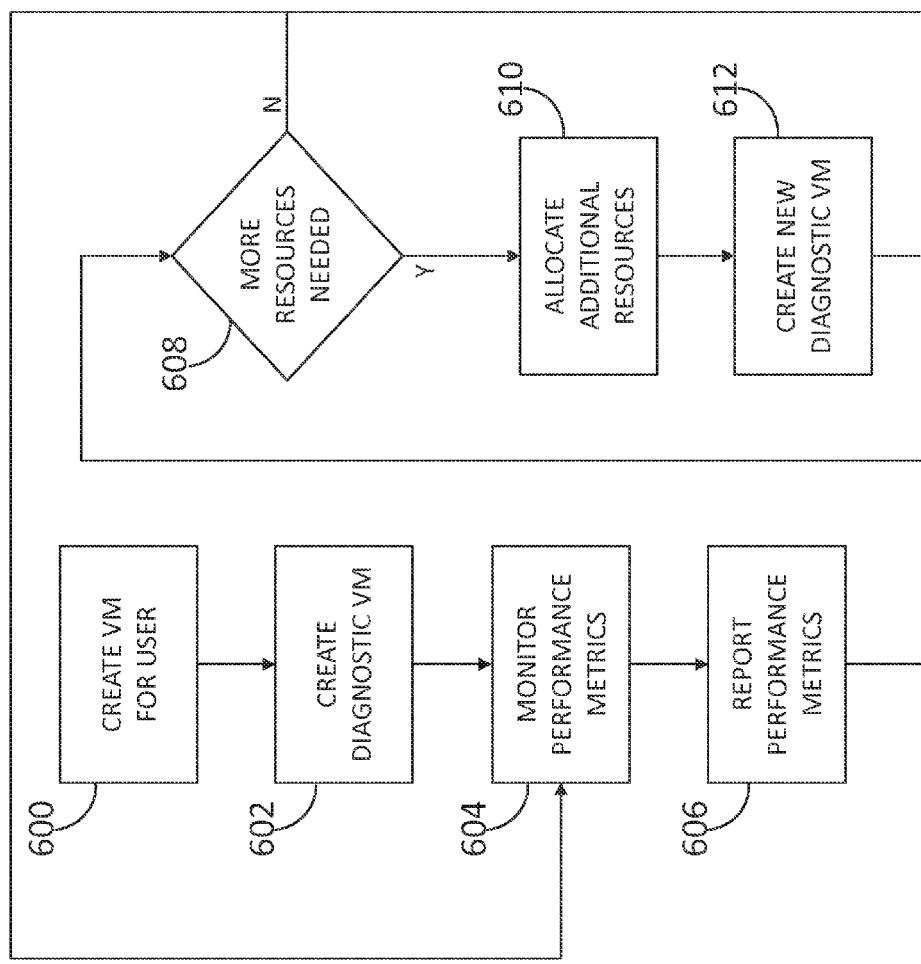

FIG. 6 illustrates a method for creating a diagnostic virtual machine and utilizing the diagnostic virtual machine to allocate physical resources in accordance with one or more illustrative aspects described herein.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 illustrates an example block diagram of a generic computing device 101 (e.g., a computer server 106a) in an example computing environment 100 that may be used according to one or more illustrative embodiments of the disclosure. According to one or more aspects, generic computing device 101 may be a server 106a in a single-server or multi-server desktop virtualization system (e.g., a cloud system) configured to provide virtual machines for client access devices. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 140 (also referred to as client devices). The terminals 140 may be personal computers or servers that include many or all of the elements described above with respect to the generic computing device 101. The network connections depicted in FIG. 1 include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as computer network 130 (e.g., the Internet). It will be appreciated that the network connections shown are illustrative and other means of establishing a communications link between the computers may be used.

Generic computing device 101 and/or terminals 140 may also be mobile terminals (e.g., mobile phones, smartphones, PDAs, notebooks, etc.) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, one or more client devices 140 may be in communication with one or more servers 106a-106n (generally referred to herein as "server(s) 106"). In one embodiment, the computing environment 100 can include an appliance installed between the server(s) 106 and client machine(s) 140. This appliance can manage client/server connections, and in some cases can load balance client connections amongst a plurality of backend servers 106.

The client machine(s) 140 can in some embodiments be referred to as a single client machine 140 or a single group of client machines 140, while server(s) 106 may be referred to as a single server 106 or a single group of servers 106. In one embodiment, a single client machine 140 communicates with more than one server 106, while in another embodiment a single server 106 communicates with more than one client machine 140. In yet another embodiment, a single client machine 140 communicates with a single server 106.

A client machine 140 can, in some embodiments, be referenced by any one of the following terms: client machine(s) 140; client(s); client computer(s); client device(s); client computing device(s); local machine; remote machine; client node(s); endpoint(s); or endpoint node(s). The server 106, in some embodiments, may be referenced by any one of the following terms: server(s), local machine; remote machine; server farm(s), or host computing device(s).

In one embodiment, the client machine 140 may be a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in aspects the virtual machine may be managed by a hypervisor executing on a server 106 or a hypervisor executing on a client 140.

The client machine 140 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

Still other embodiments include a client device 140 that displays application output generated by an application remotely executing on a server 106 or other remotely located machine. In these embodiments, the client device 140 may execute a virtual machine receiver program or application to display the output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, executes a remote presentation client or other client or program that uses a thin-client or remote-display protocol to capture display output generated by an application executing on a server 106 and transmits the application display output to a remote client 140. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106, for example, in a cloud computing environment. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments, the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or MAC OS). In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. Some embodiments include a first server 106A that receives requests from a client machine 140, forwards the request to a second server 106n, and responds to the request generated by the client machine 140 with a response from the second server 106n. The first server 106A can acquire an enumeration of applications available to the client machine 140 as well as address information associated with an application server 106 hosting an application identified within the enumeration of applications. The first server 106A can then present a response to the client's request using a web interface, and communicate directly with the client 140 to provide the client 140 with access to an identified application.

Client machines 140 can, in some embodiments, be a client node that seeks access to resources provided by a server 106. In other embodiments, the server 106 may provide clients 140 or client nodes with access to hosted resources. The server 106, in some embodiments, functions as a master node such that it communicates with one or more clients 140 or servers 106. In some embodiments, the master node can identify and provide address information associated with a server 106 hosting a requested application, to one or more clients 140 or servers 106. In still other embodiments, the master node can be a server farm 106, a client 140, a cluster of client nodes 140, or an appliance.

One or more clients 140 and/or one or more servers 106 can transmit data over a network 130 installed between machines and appliances within the computing environment 100. The network 130 can comprise one or more sub-networks, and can be installed between any combination of the clients 140, servers 106, computing machines and appliances included within the computing environment 100. In some embodiments, the network 130 can be: a local-area network (LAN); a metropolitan area network (MAN); a wide area network (WAN); a primary network 104 comprised of multiple sub-networks located between the client machines 140 and the servers 106; a primary public network 130 (e.g., the Internet) with a private sub-network; a primary private network 130 with a public sub-network; or a primary private network 130 with a private sub-network. Still further embodiments may include a network 130 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band. The network topology of the network 130 can differ within different embodiments, possible network topologies include but are not limited to: a bus network topology; a star network topology; a ring network topology; a repeater-based network topology; or a tiered-star network topology. Additional embodiments may include a network of mobile telephone networks that use a protocol to communicate among mobile devices, where the protocol may include, but is not limited to: AMPS; TDMA; CDMA; GSM; GPRS UMTS; or any other protocol able to transmit data among mobile devices.

FIG. 1 shows a high-level architecture of an illustrative desktop virtualization system. As shown, the desktop virtualization system may be a single-server, multi-server system, or cloud system, including at least one virtualization server 106 configured to provide virtual desktops and/or virtual applications to one or more client access devices 140. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Illustrated in FIG. 2 is one embodiment of a computer device 201 configured as a virtualization server in a virtualization environment, for example, a single-server, multi-server, or cloud computing environment. The virtualization server 201 illustrated in FIG. 2 can be deployed as and/or implemented by one or more embodiments of the server 106 illustrated in FIG. 1 or by other known computing devices. Included in virtualization server 201 is a hardware layer that can include one or more physical disks 204, one or more physical devices 206, one or more physical processors 208 and a physical memory 216. In some embodiments, firmware 212 can be stored within a memory element in the physical memory 216 and can be executed by one or more of the physical processors 208. The virtualization server 201 may further include an operating system 214 that may be stored in a memory element in the physical memory 216 and executed by one or more of the physical processors 208. Still further, a hypervisor 402 may be stored in a memory element in the physical memory 216 and can be executed by one or more of the physical processors 208. Executing on one or more of the physical processors 208 may be one or more virtual machines 232A-C (generally 232). Each virtual machine 232 may have a virtual disk 226A-C and a virtual processor 228A-C. In some embodiments, a first virtual machine 232A may execute, on a virtual processor 228A, a control program 220 that includes a tools stack 224. In other embodiments, one or more virtual machines 232B-C may be executed, on a virtual processor 228B-C, a guest operating system 230A-B.

Further referring to FIG. 2, and in more detail, the virtualization server 201 may include a hardware layer 210 with one or more pieces of hardware that communicate with the virtualization server 201. In some embodiments, the hardware layer 210 can include one or more physical disks 204, one or more physical devices 206, one or more physical processors 208, and one or more memory 216. Physical components 204, 206, 208, and 216 may include, for example, any of the components described above with respect to FIG. 1. For instance, physical disks 204 may include permanent memory storage, temporary memory storage, disk drives (e.g., optical, floppy, tape), hard disks, external hard drives, flash memory, network-attached storage, a storage-area network, or any other storage repository that the virtualization server 201 can access. Physical devices 206 may include any device included in the virtualization server 201 and/or any combination of devices included in the virtualization server 201 and external devices that communicate with the virtualization server 201. A physical device 206 may be, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with the virtualization server 201. The physical memory 216 in the hardware layer 210 may include any type of memory. The physical memory 216 may store data, and in some embodiments may store one or more programs, or set of executable instructions. FIG. 2 illustrates an embodiment where firmware 212 is stored within the physical memory 216 of the virtualization server 201. Programs or executable instructions stored in the physical memory 216 can be executed by the one or more processors 208 of the virtualization server 201.

Virtualization server 201 may also include a hypervisor 202. In some embodiments, hypervisor 202 may be a program executed by processors 208 on the virtualization server 201 to create and manage any number of virtual machines 232. The hypervisor 202 can be referred to as a virtual machine monitor, or platform virtualization software. In some embodiments, a hypervisor 202 can be any combination of executable instructions and hardware that monitors virtual machines executing on a computing machine. Hypervisor 202 may be a Type 2 hypervisor, or a hypervisor that executes within an operating system 214 executing on the virtualization server 201. A Type 2 hypervisor, in some embodiments, executes within an operating system 214 environment and virtual machines execute at a level above the hypervisor. In many embodiments, the Type 2 hypervisor executes within the context of a user's operating system such that the Type 2 hypervisor interacts with the user's operating system. In other embodiments, one or more virtualization servers 201 in a virtualization environment may include a Type 1 hypervisor (Not Shown). A Type 1 hypervisor may execute on the virtualization server 201 by directly accessing the hardware and resources within the hardware layer 210. That is, while a Type 2 hypervisor 202 accesses system resources through a host operating system 214, a Type 1 hypervisor may directly access all system resources without needing a host operating system 214. A Type 1 hypervisor may execute directly on one or more physical processors 208 of the virtualization server 201, and may include program data stored in the physical memory 216.

The hypervisor 202, in some embodiments, can provide virtual resources to operating systems 230 or control programs 220 executing on virtual machines 232 in any manner that simulates the operating systems 230 or control programs 220 having direct access to system resources. System resources can include: physical devices 206; physical disks; physical processors; physical memory 216 and any other component included in the virtualization server 201 hardware layer 210. In these embodiments, the hypervisor 202 may be used to emulate virtual hardware, partition physical hardware, virtualize physical hardware, or execute virtual machines that provide access to computing environments. In still other embodiments, the hypervisor 202 controls processor scheduling and memory partitioning for a virtual machine 232 executing on the virtualization server 201. Hypervisor 202 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a virtualization server 201 executes a hypervisor 202 that creates a virtual machine platform on which guest operating systems may execute. In these embodiments, the virtualization server 201 can be referred to as a host server. An example of such a virtualization server is the XEN SERVER provided by Citrix Systems, Inc., of Fort Lauderdale, Fla.

The hypervisor 202 may create one or more virtual machines 232B-C (generally 232) in which guest operating systems 230 execute. In some embodiments, the hypervisor 202 may load a virtual machine image to create a virtual machine 232. In other embodiments, the hypervisor 202 may execute a guest operating system 230 within the virtual machine 232. In still other embodiments, the virtual machine 232 may execute the guest operating system 230.

In addition to creating virtual machines 232, the hypervisor 202 may control the execution of at least one virtual machine 232. In other embodiments, the hypervisor 202 may present at least one virtual machine 232 with an abstraction of at least one hardware resource provided by the virtualization server 201 (e.g., any hardware resource available within the hardware layer 210). In other embodiments, the hypervisor 202 may control the manner in which virtual machines 232 access the physical processors 208 available in the virtualization server 201. Controlling access to the physical processors 208 may include determining whether a virtual machine 232 should have access to a processor 208, and how physical processor capabilities are presented to the virtual machine 232.

As shown in the example of FIG. 2, the virtualization server 201 may host or execute one or more virtual machines 232. A virtual machine 232 is a set of executable instructions that, when executed by a processor 208, imitate the operation of a physical computer such that the virtual machine 232 can execute programs and processes much like a physical computing device. While FIG. 2 illustrates an embodiment where a virtualization server 201 hosts three virtual machines 232, in other embodiments, the virtualization server 201 can host any number of virtual machines 232. The hypervisor 202, in some embodiments, provides each virtual machine 232 with a unique virtual view of the physical hardware, memory, processor and other system resources available to that virtual machine 232. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. For instance, the hypervisor 202 may create one or more unsecure virtual machines 232 and one or more secure virtual machines 232. Unsecure virtual machines 232 may be prevented from accessing resources, hardware, memory locations, and programs that secure virtual machines 232 may be permitted to access. In other embodiments, the hypervisor 202 may provide each virtual machine 232 with a substantially similar virtual view of the physical hardware, memory, processor and other system resources available to the virtual machines 232.

Each virtual machine 232 may include a virtual disk 226A-C (generally 226) and a virtual processor 228A-C (generally 228.) The virtual disk 226, in some embodiments, is a virtualized view of one or more physical disks 204 of the virtualization server 201, or a portion of one or more physical disks 204 of the virtualization server 201. The virtualized view of the physical disks 204 can be generated, provided and managed by the hypervisor 202. In some embodiments, the hypervisor 202 provides each virtual machine 232 with a unique view of the physical disks 204. Thus, in these embodiments, the virtual disk 226 included in each virtual machine 232 can be unique when compared with the other virtual disks 226.

A virtual processor 228 can be a virtualized view of one or more physical processors 208 of the virtualization server 201. In some embodiments, the virtualized view of the physical processors 208 can be generated, provided and managed by the hypervisor 202. In some embodiments, the virtual processor 228 has substantially all of the same characteristics of at least one physical processor 208. In other embodiments, the virtual processor 208 provides a modified view of the physical processors 208 such that at least some of the characteristics of the virtual processor 228 are different than the characteristics of the corresponding physical processor 208.

FIG. 3 shows an illustrative infrastructure as a service cloud in which a diagnostic virtual machine may be created in accordance with one or more illustrative aspects described herein. Referring to FIG. 3, infrastructure as a service cloud 300 may include physical resources for supporting one or more virtual machines. For example, infrastructure as a service cloud 300 may include physical resources 302 and 304. Physical resources 302 and 304 may include any physical resources of infrastructure as a service cloud 300 utilized to support one or more virtual machines. For example, physical resources 302 and 304 may include one or more processors, memories, storage mediums, or network interfaces utilized to support one or more virtual machines. Infrastructure as a service cloud 300 may also include one or more hypervisors for mediating access to physical resources 302 and 304. Such hypervisors may be organized as clusters. For example, infrastructure as a service cloud 300 may include hypervisor clusters 306 and 308. As indicated above, the hypervisors of hypervisor clusters 306 and 308 may include Type I ("native") or Type II ("hosted") hypervisors.

One or more of the hypervisors of hypervisor clusters 306 and 308 may host one or more virtual machines. For example, hypervisor "1" of hypervisor cluster 306 may host virtual machine 310. Similarly, hypervisor "2" of hypervisor cluster 306 may host virtual machine 312; hypervisor "A" of hypervisor cluster 308 may host virtual machine 314; and hypervisor "B" of hypervisor cluster 308 may host virtual machine 316. The virtual machines hosted by one or more of the hypervisors of hypervisor clusters 306 and 308 may be utilized by one or more users via one or more user devices. A user device may be, for example, a personal computer (e.g., a desktop or laptop computer) or a mobile device (e.g., a tablet computer or smartphone). For example, virtual machine 310 may be utilized via user device 318. Similarly, virtual machine 312 may be utilized via user device 320; virtual machine 314 may be utilized via user device 322; and virtual machine 316 may be utilized via user device 324.

As indicated above, virtualization presents new challenges for diagnosing problems or performance issues, and providing support to end users. For example, virtualization may involve allocation of physical resources among multiple virtual machines. For example, physical resources 302 may be associated with hypervisor cluster 306, while physical resources 304 may be associated with hypervisor cluster 308. Hypervisor cluster 306 may utilize physical resources 302 to support virtual machines 310 and 312, and hypervisor cluster 308 may utilize physical resources 304 to support virtual machines 314 and 316. Thus if virtual machine 310 experiences performance problems (e.g., due to an overutilization of memory), performance metrics available to virtual machines 314 and 316 may be of little use in diagnosing virtual machine 310's performance problems because performance metrics (e.g., current memory utilization) available to virtual machines 314 and 316 may correspond to physical resources 304 rather than physical resources 302. Similarly, performance metrics available to virtual machine 312 may be of little use in diagnosing virtual machine 310's performance problems because performance metrics (e.g., current memory utilization) available to virtual machine 312 may correspond to a different portion of physical resources 302 associated with hypervisor "2" of hypervisor cluster 306 rather than the portion of physical resources 302 associated with hypervisor "1" of hypervisor cluster 306.

In accordance with aspects of the disclosure, a diagnostic virtual machine may be created within infrastructure as a service cloud 300. For example, diagnostic virtual machine 326 may be created within infrastructure as a service cloud 300. As used herein, "diagnostic virtual machine" refers to a virtual machine configured specifically to perform one or more diagnostic functions. For example, diagnostic virtual machine 326 may be configured to provide one or more performance metrics (e.g., processor utilization, memory utilization, network utilization, or storage utilization) related to physical resources 302 or a portion thereof. Once a diagnostic virtual machine is created, access to it may be provided via one or more user devices. For example, access to diagnostic virtual machine 326 may be provided to a user via user device 328. In some embodiments, diagnostic virtual machine 326 may be configured to monitor a cluster of hypervisors and may be provided access to physical resources associated with the cluster of hypervisors. For example, diagnostic virtual machine 326 may be configured to monitor hypervisor cluster 306 and may be provided access to physical resources 302. In some embodiments, diagnostic virtual machine 326 may be configured to be hosted by one or more specific hypervisors within a cluster of hypervisors, and may be provided access to a portion of physical resources associated with such hypervisor(s). For example, diagnostic virtual machine 326 may be configured to be hosted by hypervisor "1" of hypervisor cluster 306, and diagnostic virtual machine 326 may be provided access to a portion of physical resources 302 associated with hypervisor "1" of hypervisor cluster 306.

It will be appreciated, that by configuring diagnostic virtual machine 326 to monitor a cluster of hypervisors and providing diagnostic virtual machine 326 with access to physical resources associated with the cluster of hypervisors, and/or configuring diagnostic virtual machine 326 to be hosted by a specific hypervisor within a cluster of hypervisors and providing diagnostic virtual machine 326 with access to a portion of physical resources associated with the specific hypervisor(s), diagnostic virtual machine 326 may provide one or more diagnostic functions that more closely represent actual conditions experienced by a virtual machine hosted by the cluster of hypervisors, accessing the physical resources associated with the cluster of hypervisors, or hosted by the specific hypervisor within the cluster of hypervisors. For example, returning to the scenario described above, if virtual machine 310 experiences performance problems (e.g., due to an overutilization of memory), diagnostic virtual machine 326 may be created and may be configured to be hosted by the specific hypervisor within hypervisor cluster 306 that is hosting virtual machine 310 (e.g., hypervisor "1"), and may be configured to access the portion of physical resources 302 which virtual machine 310 is configured to access. Accordingly, performance metrics (e.g., current memory utilization) available to diagnostic virtual machine 326 may more accurately represent the performance of virtual machine 310. As will be described in greater detail below, such performance metrics may be utilized to allocate additional physical resources to hypervisor cluster 306, hypervisor "1" of hypervisor cluster 306, or virtual machine 310. Additionally or alternatively, diagnostic virtual machine 326 may be utilized by an administrator associated with hypervisor cluster 306 to identify or diagnose one or more problems being experienced by virtual machine 310 (e.g., a memory leak associated with an application being run by virtual machine 310).

FIG. 4 shows an illustrative infrastructure as a service cloud that includes multiple isolated networks in which a diagnostic virtual machine may be created in accordance with one or more illustrative aspects described herein. Referring to FIG. 4, as discussed above with respect to FIG. 3, infrastructure as a service cloud 400 may include physical resources 402 for supporting one or more virtual machines. Infrastructure as a service cloud 400 may also include hypervisor cluster 404 for mediating access to physical resources 402. One or more of the hypervisors of hypervisor cluster 404 may host one or more virtual machines. For example, hypervisor "1" of hypervisor cluster 404 may host virtual machine 406. Similarly, hypervisor "2" of hypervisor cluster 404 may host virtual machine 408; and hypervisor "N" of hypervisor cluster 404 may host virtual machines 410 and 412. The virtual machines hosted by one or more of the hypervisors of hypervisor cluster 404 may be utilized by one or more users via one or more user devices. For example, virtual machine 406 may be utilized via user device 414. Similarly, virtual machine 408 may be utilized via user device 416; virtual machine 410 may be utilized via user device 418; and virtual machine 412 may be utilized via user device 420.

One or more virtual machines within infrastructure as a service cloud 400 may communicate with each other via a network isolated from other virtual machines within infrastructure as a service cloud 400. In some embodiments, one or more virtual machines may be isolated from other virtual machines within infrastructure as a service cloud 400 via, for example, a virtual local area network (VLAN) and/or one or more other forms of network isolation such as overlay networks (e.g., Generic Routing Encapsulation (GRE) tunnels, Virtual eXtensible Local Area Networks (VxLANs)). For example, virtual machines 406 and 408 may be part of VLAN 422. Similarly, virtual machines 410 and 412 may be part of VLAN 424. VLANs 422 and 424 may be isolated from each other and/or from one or more other VLANs or virtual machines within infrastructure as a service cloud 400. For example, VLANs 422 and 424 may correspond to different customers of infrastructure as a service cloud 400. As indicated above, virtualization presents new challenges for diagnosing problems or performance issues. For example, due to the isolation of VLANs 422 and 424 from each other, performance metrics (e.g., network utilization) pertaining to VLAN 424 may have little relevance to actual conditions of VLAN 422.

In accordance with aspects of the disclosure, a diagnostic virtual machine may be created within infrastructure as a service cloud 400 and may be configured to operate within one or more networks (e.g., VLANs) isolated from one or more virtual machines within infrastructure as a service cloud 400. For example, diagnostic virtual machine 426 may be created within infrastructure as a service cloud 400 and may be configured to operate within VLAN 422. Once created, diagnostic virtual machine 426 may be accessed by one or more users, for example, via user device 428.

It will be appreciated, that by configuring diagnostic virtual machine 426 to operate within VLAN 422, diagnostic virtual machine 426 may provide one or more diagnostic functions that more closely represent actual conditions experienced by a virtual machine operating within VLAN 422 (e.g., virtual machines 406 and 408). For example, if virtual machine 406 experiences performance problems (e.g., due to an overutilization of network resources within VLAN 422), diagnostic virtual machine 426 may be created and may be configured to operate within VLAN 422. Accordingly, performance metrics (e.g., current network utilization) available to diagnostic virtual machine 426 may more accurately represent conditions experienced by virtual machine 406. As will be described in greater detail below, such performance metrics may be utilized to allocate additional resources to hypervisor cluster 404, hypervisor "1" of hypervisor cluster 404, virtual machine 406, or VLAN 422. Additionally or alternatively, diagnostic virtual machine 426 may be utilized by an administrator associated with hypervisor cluster 404 to identify or diagnose one or more problems being experienced by virtual machine 406 (e.g., an application or service consuming network resources within VLAN 422).

FIG. 5 illustrates a method for creating a diagnostic virtual machine in response to a user request for assistance in accordance with one or more illustrative aspects described herein. Referring to FIG. 5, the steps may be performed by one or more computing devices of an infrastructure as a service cloud. For example, one or more program modules of control program 220, running on virtual machine 232A, may configure virtualization server 201 to perform one or more steps described herein. At step 500, a virtual machine may be created for a user. For example, virtual machine 406 may be created within infrastructure as a service cloud 400 for a user utilizing user device 414. At step 502, a support request may be received from the virtual machine user. For example, a support request may be received from user device 414 indicating that a user utilizing virtual machine 406 is having trouble accessing a network resource (e.g., due to limited network availability). At step 504, a cluster of hypervisors supporting the virtual machine may be identified. For example, virtual machine 406 may be supported by hypervisor cluster 404, and on or more program modules of control program 220 may identify hypervisor cluster 404 as supporting virtual machine 406. At step 506, a specific hypervisor hosting the virtual machine may be identified from among one or more hypervisors of the hypervisor cluster supporting the virtual machine. For example, hypervisor "1" of hypervisor cluster 404 may be hosting virtual machine 406, and one or more program modules of control program 220 may identify hypervisor "1" of hypervisor cluster 404 as hosting virtual machine 406.

At step 508, a diagnostic virtual machine may be created. For example, diagnostic virtual machine 426 may be created. In some embodiments, diagnostic virtual machine 426 may be configured to be hosted by the identified cluster of hypervisors supporting virtual machine 406 and/or the identified one or more hypervisors of hypervisor cluster 404 hosting virtual machine 406. For example, diagnostic virtual machine 426 may be configured to be hosted by hypervisor "1" of hypervisor cluster 404. In some embodiments, diagnostic virtual machine 426 may be configured to monitor hypervisor cluster 404, hypervisor "1" of hypervisor cluster 404, physical resources 402, and/or a portion of physical resources 402 associated with hypervisor "1" of hypervisor cluster 404. At step 510, a determination may be made as to whether the virtual machine is part of a VLAN. For example, one or more program modules of control program 220, may determine that virtual machine 406 is part of VLAN 422. At step 512, in response to determining that the virtual machine is part of a VLAN, the diagnostic virtual machine may be configured to be part of the VLAN. For example, in response to determining that virtual machine 406 is part of VLAN 422, diagnostic virtual machine 426 may be configured to be part of VLAN 422. Returning to step 510, in response to determining that the virtual machine is not a part of a VLAN, the method may proceed to step 514. For example, one or more program modules of control program 220 may determine that virtual machine 426 is not part of a VLAN, and therefore it may not be necessary to configure diagnostic virtual machine 426 to be part of a VLAN.

At step 514, a user device may be provided access to the diagnostic virtual machine. For example, user device 428 may be provided access to diagnostic virtual machine 426. In some embodiments, user device 428 may be utilized by an administrator of hypervisor cluster 404 who is responding to the service request from the user of virtual machine 406. It will be appreciated that by configuring diagnostic virtual machine 426 to be supported by hypervisor cluster 404, to be hosted by hypervisor "1" of hypervisor cluster 404, to be a part of VLAN 422, and/or to have access to physical resources 402 or a portion of physical resources 402 associated with virtual machine 406, diagnostic virtual machine 426 may present the administrator with a view of infrastructure as a service cloud 400 similar to that being experienced by the user of virtual machine 406. For example, referring to the scenario described above, if the user utilizing virtual machine 406 is having trouble accessing a network resource (e.g., due to limited network availability), the administrator may utilize diagnostic virtual machine 426 to obtain one or more performance metrics (e.g., network utilization) associated with physical resources 402. The performance metric(s) may then be utilized by the administrator in diagnosing the underlying problem (e.g., overutilization of one or more resources within physical resources 402 or too much network traffic associated with VLAN 422).

FIG. 6 illustrates a method for creating a diagnostic virtual machine and utilizing the diagnostic virtual machine to allocate physical resources in accordance with one or more illustrative aspects described herein. Referring to FIG.

6, the steps may be performed by one or more computing devices of an infrastructure as a service cloud. For example, one or more program modules of control program 220, running on virtual machine 232A, may configure virtualization server 201 to perform one or more steps described herein. At step 600, a virtual machine may be created for a user. For example, virtual machine 310 may be created within infrastructure as a service cloud 300 for a user utilizing user device 318. At step 602, a diagnostic virtual machine may be created. For example, diagnostic virtual machine 326 may be created. In some embodiments, diagnostic virtual machine 326 may be configured to be supported by a cluster of hypervisors supporting the virtual machine, hosted by a specific hypervisor within the cluster of hypervisors supporting the virtual machine that hosts the virtual machine, and/or access physical resources associated with the cluster of hypervisors or a portion of the physical resources associated with the cluster of hypervisors that are associated with the virtual machine. For example, virtual machine 310 may be hosted by hypervisor "1" of hypervisor cluster 306 and associated with a portion of physical resources 302, and diagnostic virtual machine 326 may be configured to be hosted by hypervisor "1" of hypervisor cluster 306 and associated with the portion of physical resources 302 associated with virtual machine 310.

At step 604, the diagnostic virtual machine may monitor one or more performance metrics. For example, diagnostic virtual machine 326 may be configured to monitor one or more performance metrics (e.g., processor utilization, network utilization, memory utilization, storage utilization) for the portion of physical resources 302 associated with virtual machine 310. At step 606, the diagnostic virtual machine may report the one or more monitored performance metrics to a resource management service of the infrastructure as a service cloud. For example, diagnostic virtual machine 326 may report one or more performance metrics (e.g., memory utilization) to one or more program modules of control program 220. At step 608, the resource management service may determine, based on the one or more reported performance metrics, whether additional physical resources should be allocated to the cluster of hypervisors and/or one or more specific hypervisors within the cluster of hypervisors. For example, one or more program modules of control program 220 may determine, based on the performance metrics reported by diagnostic virtual machine 326, whether additional physical resources (e.g., additional memory) should be allocated to hypervisor cluster 306 and/or hypervisor "1" of hypervisor cluster 306.

At step 610, responsive to determining that additional physical resources should be allocated to the cluster of hypervisors and/or one or more specific hypervisors within the cluster of hypervisors, the resource management service may trigger the allocation of the additional physical resources. For example, responsive to one or more program modules of control program 220 determining that additional physical resources (e.g., additional memory) should be allocated to hypervisor cluster 306 and/or hypervisor "1" of hypervisor cluster 306, one or more program modules of control program 220 may trigger the allocation of the additional physical resources to hypervisor cluster 306 and/or hypervisor "1" of hypervisor cluster 306 (e.g., a portion of memory within physical resources 304 may be allocated to physical resources 302, associated with hypervisor cluster 306 and/or hypervisor "1" of hypervisor cluster 306).

At step 612, a new diagnostic virtual machine may be created. For example, one or more program modules of control program 220 may trigger the creation of a new diagnostic virtual machine configured to monitor one or more performance metrics for the additional physical resources allocated to hypervisor cluster 306 and/or hypervisor "1" of hypervisor cluster 306. The method may then return to step 604, where the diagnostic virtual machine(s) (e.g., diagnostic virtual machine 326 and/or the new diagnostic virtual machine) may monitor the one or more performance metrics. Returning to step 608, responsive to determining that additional physical resources do not need to be allocated to the cluster of hypervisors and/or one or more specific hypervisors within the cluster of hypervisors, the method may return to step 604, where diagnostic virtual machine 326 may continue to monitor the one or more performance metrics.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the spirit and scope of the following claims.

What is claimed is:

1. A method comprising:
    creating a diagnostic virtual machine configured to monitor a cluster of hypervisors and have access to physical resources, of an infrastructure as a service cloud, associated with a virtual machine hosted by the cluster of hypervisors;
    reporting, by the diagnostic virtual machine and to a resource management service of the infrastructure as a service cloud, one or more performance metrics related to the physical resources;
    determining, by the resource management service and based on the one or more performance metrics, that additional physical resources of the infrastructure as a service cloud should be allocated to the cluster of hypervisors;
    triggering, by the resource management service, allocation of the additional physical resources to the cluster of hypervisors; and
    triggering, by the resource management service, creation of a new diagnostic virtual machine, the new diagnostic virtual machine having access to the additional physical resources.

2. The method of claim 1, comprising receiving, by the virtual machine, input from a user requesting assistance from an administrator of the cluster of hypervisors.

3. The method of claim 2, wherein creating the diagnostic virtual machine is performed in response to receiving the input.

4. The method of claim 1, wherein the virtual machine is hosted by one or more specific hypervisors of the cluster of hypervisors, the method comprising configuring the diagnostic virtual machine to be hosted by the one or more specific hypervisors.

5. The method of claim 1, wherein the virtual machine is configured to operate within a network isolated from one or more other virtual machines supported by the infrastructure as a service cloud, the method comprising configuring the diagnostic virtual machine to operate within the network.

6. The method of claim 5, wherein the network comprises at least one of a Virtual Local Area Network (VLAN), a Generic Routing Encapsulation (GRE) tunnel, or a Virtual eXtensible Local Area Network (VxLAN).

7. The method of claim 1, wherein the one or more performance metrics comprise at least one of processor utilization, memory utilization, network utilization, or storage utilization.

8. A system comprising:
at least one processor; and
a memory storing instructions that when executed by the at least one processor cause:
the system to create a diagnostic virtual machine configured to monitor a cluster of hypervisors and have access to physical resources, of an infrastructure as a service cloud, associated with a virtual machine hosted by the cluster of hypervisors;
the diagnostic virtual machine to report, to a resource management service of the infrastructure as a service cloud, one or more performance metrics related to the physical resources; and
the resource management service to:
determine, based on the one or more performance metrics, that additional physical resources of the infrastructure as a service cloud should be allocated to the cluster of hypervisors;
trigger allocation of the additional physical resources to the cluster of hypervisors; and
trigger creation of a new diagnostic virtual machine, the new diagnostic virtual machine having access to the additional physical resources.

9. The system of claim 8, wherein the instructions, when executed by the at least one processor, cause the virtual machine to receive input from a user requesting assistance from an administrator of the cluster of hypervisors.

10. The system of claim 9, wherein the instructions, when executed by the at least one processor, cause the system to create the diagnostic virtual machine in response to the virtual machine receiving the input.

11. The system of claim 8, wherein:
the virtual machine is hosted by one or more specific hypervisors of the cluster of hypervisors; and
the instructions, when executed by the at least one processor, cause the system to configure the diagnostic virtual machine to be hosted by the one or more specific hypervisors.

12. The system of claim 8, wherein:
the virtual machine is configured to operate within a network isolated from one or more other virtual machines supported by the infrastructure as a service cloud; and
the instructions, when executed by the at least one processor, cause the system to configure the diagnostic virtual machine to operate within the network.

13. The system of claim 12, wherein the network comprises at least one of a Virtual Local Area Network (VLAN), a Generic Routing Encapsulation (GRE) tunnel, or a Virtual eXtensible Local Area Network (VxLAN).

14. The system of claim 8, wherein the one or more performance metrics comprise at least one of processor utilization, memory utilization, network utilization, or storage utilization.

15. One or more non-transitory computer-readable media comprising instructions that when executed by one or more computers cause:
the one or more computers to create a diagnostic virtual machine configured to monitor a cluster of hypervisors and have access to physical resources, of an infrastructure as a service cloud, associated with a virtual machine hosted by the cluster of hypervisors;
the diagnostic virtual machine to report, to a resource management service of the infrastructure as a service cloud, one or more performance metrics related to the physical resources; and
the resource management service to:
determine, based on the one or more performance metrics, that additional physical resources of the infrastructure as a service cloud should be allocated to the cluster of hypervisors;
trigger allocation of the additional physical resources to the cluster of hypervisors; and
trigger creation of a new diagnostic virtual machine, the new diagnostic virtual machine having access to the additional physical resources.

16. The one or more non-transitory computer-readable media of claim 15, wherein the instructions, when executed by the one or more computers, cause:
the virtual machine to receive input from a user requesting assistance from an administrator of the cluster of hypervisors; and
the one or more computers to create the diagnostic virtual machine in response to the virtual machine receiving the input.

17. The one or more non-transitory computer-readable media of claim 15, wherein:
the virtual machine is hosted by one or more specific hypervisors of the cluster of hypervisors; and
the instructions, when executed by the one or more computers, cause the one or more computers to configure the diagnostic virtual machine to be hosted by the one or more specific hypervisors.

18. The one or more non-transitory computer-readable media of claim 15, wherein:
the virtual machine is configured to operate within a network isolated from one or more other virtual machines supported by the infrastructure as a service cloud; and
the instructions, when executed by the one or more computers, cause the one or more computers to configure the diagnostic virtual machine to operate within the network.

19. The one or more non-transitory computer-readable media of claim 18, wherein the network comprises at least one of a Virtual Local Area Network (VLAN), a Generic Routing Encapsulation (GRE) tunnel, or a Virtual eXtensible Local Area Network (VxLAN).

20. The one or more non-transitory computer-readable media of claim 15, wherein the one or more performance metrics comprise at least one of processor utilization, memory utilization, network utilization, or storage utilization.

* * * * *